United States Patent
Weaver et al.

(10) Patent No.: US 11,156,110 B1
(45) Date of Patent: Oct. 26, 2021

(54) ROTOR ASSEMBLY FOR A TURBINE SECTION OF A GAS TURBINE ENGINE

(71) Applicant: General Electric Company, Schenectady, NY (US)

(72) Inventors: Matthew Mark Weaver, Loveland, OH (US); Todd William Bachmann, Edgewood, KY (US); Dane Michael Dale, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/984,472

(22) Filed: Aug. 4, 2020

(51) Int. Cl.
*F01D 5/32* (2006.01)
*F01D 5/30* (2006.01)

(52) U.S. Cl.
CPC .............. *F01D 5/303* (2013.01); *F01D 5/32* (2013.01); *F05D 2220/32* (2013.01); *F05D 2240/242* (2013.01)

(58) Field of Classification Search
None
See application file for complete search history.

(56) References Cited

U.S. PATENT DOCUMENTS

| | | |
|---|---|---|
| 814,757 A | 3/1906 | Wilkinson |
| 3,203,666 A * | 8/1965 | West ..................... F01D 5/3038 416/215 |
| 3,235,346 A | 2/1966 | Hucke |
| 3,487,879 A | 1/1970 | McCarthy et al. |
| 3,981,609 A | 9/1976 | Koenig |
| 4,013,376 A | 3/1977 | Bisson et al. |
| 4,037,990 A | 7/1977 | Harris |
| 4,045,149 A | 8/1977 | Ravenhall |
| 4,192,633 A * | 3/1980 | Herzner .................... F01D 5/10 415/119 |
| 4,767,271 A | 8/1988 | Catlow |
| 4,868,963 A | 9/1989 | Corsmeier et al. |
| 4,966,527 A | 10/1990 | Merz |
| 5,007,800 A | 4/1991 | Hacault et al. |
| 5,017,092 A | 5/1991 | Violette et al. |
| 5,018,942 A * | 5/1991 | Ciokajlo ................. F01D 11/22 415/173.2 |
| 5,056,988 A * | 10/1991 | Corsmeier .............. F01D 11/22 415/173.2 |
| 5,096,375 A * | 3/1992 | Ciokailo ................. F01D 11/22 415/127 |
| 5,104,287 A * | 4/1992 | Ciokajlo ............... F04D 29/526 415/173.2 |

(Continued)

FOREIGN PATENT DOCUMENTS

EP 2108785 A2 10/2009

*Primary Examiner* — Michael Lebentritt
(74) *Attorney, Agent, or Firm* — Dority & Manning, P.A.

(57) ABSTRACT

A rotor assembly for a gas turbine engine includes a shaft and first and second annular drum segments coupled to the shaft. Furthermore, the rotor assembly includes an annular flange positioned between the first and second annular drum segments along the axial centerline, with the annular flange coupled to the first and second annular outer drum segments. Additionally, the rotor assembly includes a blade having a shank section and an airfoil section. The shank section is, in turn, coupled to the annular flange such the airfoil section extends inward along the radial direction toward the axial centerline and into a hot gas path of the gas turbine engine.

20 Claims, 5 Drawing Sheets

(56) References Cited

U.S. PATENT DOCUMENTS

| | | | |
|---|---|---|---|
| 5,163,817 A | 11/1992 | Violette et al. | |
| 5,198,282 A | 3/1993 | Baker et al. | |
| 5,314,307 A | 5/1994 | Farmer | |
| 5,405,245 A | 4/1995 | Cornelius | |
| 5,409,353 A | 4/1995 | Imbault | |
| 5,436,042 A | 7/1995 | Lau et al. | |
| 5,762,472 A | 6/1998 | Pizzi et al. | |
| 6,024,898 A | 2/2000 | Steibel et al. | |
| 6,457,936 B1 * | 10/2002 | Leach | F01D 25/28 |
| | | | 415/138 |
| 6,506,022 B2 | 1/2003 | Bunker | |
| 6,857,856 B2 | 2/2005 | Potter et al. | |
| 7,169,465 B1 | 1/2007 | Karandikar et al. | |
| 7,217,089 B2 | 5/2007 | Durocher et al. | |
| 7,291,946 B2 | 11/2007 | Clouse et al. | |
| 7,300,255 B2 | 11/2007 | Potter et al. | |
| 7,510,379 B2 | 3/2009 | Marusko et al. | |
| 7,550,107 B2 | 6/2009 | Morrison et al. | |
| 7,771,171 B2 | 8/2010 | Mohr et al. | |
| 8,016,565 B2 | 9/2011 | Berg et al. | |
| 8,087,881 B1 | 1/2012 | Cardoso, III et al. | |
| 8,105,016 B2 | 1/2012 | Butz et al. | |
| 8,151,437 B2 | 4/2012 | Muller et al. | |
| 8,206,118 B2 | 6/2012 | Propheter-Hinckley et al. | |
| 8,231,354 B2 | 7/2012 | Campbell et al. | |
| 8,256,228 B2 * | 9/2012 | O'Leary | F01D 11/22 |
| | | | 60/782 |
| 8,398,366 B2 | 3/2013 | Twell | |
| 8,491,743 B2 | 7/2013 | Pham et al. | |
| 8,794,925 B2 | 8/2014 | McCaffrey | |
| 8,864,472 B2 | 10/2014 | Gignoux et al. | |
| 8,978,729 B2 | 3/2015 | Pham et al. | |
| 8,979,486 B2 | 3/2015 | Rioux | |
| 9,090,027 B2 | 7/2015 | Sutton et al. | |
| 9,163,519 B2 | 10/2015 | Kleinow et al. | |
| 9,259,858 B2 | 2/2016 | Gupta et al. | |
| 9,482,108 B2 | 11/2016 | Garcia Crespo | |
| 9,499,253 B1 | 11/2016 | White | |
| 9,739,156 B2 | 8/2017 | Boeck et al. | |
| 9,790,809 B2 | 10/2017 | Dube et al. | |
| 9,903,210 B2 | 2/2018 | Evans et al. | |
| 9,932,901 B2 | 4/2018 | Sener | |
| 9,995,155 B2 | 6/2018 | Carnell | |
| 10,569,481 B2 | 2/2020 | Gallier et al. | |
| 11,015,475 B2 * | 5/2021 | Kapadia | F01D 25/10 |
| 2003/0024630 A1 | 2/2003 | George et al. | |
| 2003/0163984 A1 | 9/2003 | Seda et al. | |
| 2004/0163262 A1 | 8/2004 | King et al. | |
| 2005/0158171 A1 | 7/2005 | Carper et al. | |
| 2009/0097979 A1 | 4/2009 | Erdmann et al. | |
| 2009/0165924 A1 | 7/2009 | Steibel et al. | |
| 2011/0163506 A1 * | 7/2011 | Hafner | F01D 5/323 |
| | | | 277/309 |
| 2011/0206522 A1 | 8/2011 | Alvanos et al. | |
| 2012/0255870 A1 | 10/2012 | Rebak et al. | |
| 2012/0301317 A1 | 11/2012 | Alvanos et al. | |
| 2013/0004296 A1 | 1/2013 | Propheter-Hinckley et al. | |
| 2013/0011271 A1 | 1/2013 | Shi et al. | |
| 2013/0052032 A1 | 2/2013 | Fachat et al. | |
| 2013/0064668 A1 | 3/2013 | Paige, II et al. | |
| 2013/0094969 A1 * | 4/2013 | Amaral | F01D 11/006 |
| | | | 416/219 R |
| 2013/0185924 A1 | 7/2013 | Bellanger et al. | |
| 2013/0251939 A1 | 9/2013 | Kleinow | |
| 2014/0014792 A1 * | 1/2014 | Willis | F16B 43/005 |
| | | | 248/200 |
| 2014/0294572 A1 | 10/2014 | Hillier et al. | |
| 2015/0211636 A1 | 7/2015 | Panchal et al. | |
| 2016/0003094 A1 | 1/2016 | Renggli et al. | |
| 2016/0138406 A1 | 5/2016 | Freeman | |
| 2016/0265370 A1 | 9/2016 | Benson | |
| 2016/0341052 A1 | 11/2016 | Li et al. | |
| 2017/0101873 A1 | 4/2017 | Morgan et al. | |
| 2017/0122113 A1 | 5/2017 | Kittleson et al. | |
| 2017/0130593 A1 | 5/2017 | Weaver | |
| 2017/0211590 A1 | 7/2017 | Moniz et al. | |
| 2017/0362941 A1 | 12/2017 | Craig, III | |
| 2018/0230832 A1 * | 8/2018 | Dierksmeier | F01D 5/186 |
| 2018/0230857 A1 * | 8/2018 | Weaver | F01D 25/005 |
| 2018/0238188 A1 | 8/2018 | Shoemaker et al. | |
| 2018/0370158 A1 | 12/2018 | Gallier et al. | |
| 2019/0093489 A1 | 3/2019 | Mondal et al. | |
| 2019/0338656 A1 | 11/2019 | Weaver | |
| 2019/0338658 A1 | 11/2019 | Weaver | |
| 2020/0072061 A1 | 3/2020 | Weaver et al. | |

* cited by examiner

ROTOR ASSEMBLY FOR A TURBINE SECTION OF A GAS TURBINE ENGINE

FIELD

The present subject matter relates to gas turbine engines and, more particularly, to rotor assemblies for a turbine section of a gas turbine engine.

BACKGROUND

A gas turbine engine generally includes a compressor section, a combustion section, and a turbine section. More specifically, the compressor section progressively increases the pressure of air entering the gas turbine engine and supplies this compressed air to the combustion section. The compressed air and a fuel mix within the combustion section and burn within a combustion chamber to generate high-pressure and high-temperature combustion gases. The combustion gases flow through the turbine section before exiting the engine. In this respect, the turbine section converts energy from the combustion gases into rotational energy. This rotational energy is, in turn, used to rotate one or more shafts, which drive the compressor section and/or a fan assembly of the gas turbine engine.

To increase engine performance and efficiency, some turbine sections include one or more vaneless counter-rotating turbines. In general, such turbines include an inner rotor having one or more rows of blades. Furthermore, such turbines include an outer rotor having a drum and one or more rows of blades coupled to the drum. The blades of the inner rotor are interdigitated with the blades of the outer rotor. As such, the flow of the combustion gases through the turbine section rotates the inner rotor in one direction, while rotating the outer rotor in the opposite direction. The rotation of the inner and outer rotors, in turn, drives one of the shafts of the gas turbine engine.

Coupling the blades to the outer rotor presents challenges. For example, current coupling configurations generally require the formation of mounting features (e.g., holes, slots, and/or the like) on or within the outer drum. These features are difficult and time-consuming to form, particularly when the outer rotor is formed from a composite material (e.g., a ceramic matrix composite).

Accordingly, an improved rotor assembly for a turbine section of a gas turbine engine would be welcomed in the technology. More particularly, an improved rotor assembly for a turbine section of a gas turbine engine that allows for a thinner outer rotor drum with a longer service life would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a rotor assembly for a gas turbine engine. The gas turbine engine, in turn, defines an axial centerline and a radial direction extending outward from the axial centerline. The rotor assembly includes a shaft and first and second annular drum segments coupled to the shaft. Furthermore, the rotor assembly includes an annular flange positioned between the first and second annular drum segments along the axial centerline, with the annular flange coupled to the first and second annular outer drum segments. Additionally, the rotor assembly includes a blade having a shank section and an airfoil section. The shank section is, in turn, coupled to the annular flange such the airfoil section extends inward along the radial direction toward the axial centerline and into a hot gas path of the gas turbine engine.

In another aspect, the present subject matter is directed to a gas turbine engine defining an axial centerline and a radial direction extending outward from the axial centerline. The gas turbine engine includes a turbine section and a shaft coupling the turbine section to at least one of a compressor section of the gas turbine engine or a fan section of the gas turbine engine. The turbine section, in turn, includes first and second annular drum segments coupled to the shaft and an annular flange positioned between the first and second annular drum segments along the axial centerline. The annular flange is, in turn, coupled to the first and second annular outer drum segments. Moreover, the turbine section includes a blade including a shank section and an airfoil section. The shank section is, in turn, coupled to the annular flange such the airfoil section extends inward along the radial direction toward the axial centerline and into a hot gas path of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a rotor assembly for a gas turbine engine. As will be described below, the gas turbine engine includes a turbine section and one or more shafts coupling the turbine section to a compressor section and/or a fan section of the gas turbine. More specifically, the turbine section includes inner and outer rotors coupled to the shaft(s). In this respect, the inner rotor includes one or more rows of inner rotor blades extending outward in a radial direction of the engine. Moreover, the outer rotor includes a drum and one or more rows of outer rotor blades extending inward from the drum toward an axial centerline of the engine in the radial direction. Additionally, the rows of outer rotor blades are interdigitated with the rows of inner rotor blades. Thus, during operation of the gas turbine engine, the outer rotor rotates in the opposite direction of the inner rotor.

In accordance with aspects of the present subject matter, the outer rotor includes one or more annular flanges for coupling the outer rotor blades to the drum. Specifically, in several embodiments, the drum includes first and second annular drum segments. In such embodiments, an annular flange is positioned between the first and second annular drum segments along the axial centerline. Furthermore, the annular flange is coupled to the first and second annular drum segments via suitable fasteners. As such, the annular flange extends from its first end, which is coupled to the drum segments, inward along the radial direction to its second end. The second end of the annular flange couples to one of the rows of outer rotor blades. For example, in one embodiment, a pin couples each outer rotor blade of the corresponding row to the annular flange. In another embodiment, each rotor blade may include a shank section that is received within a slot defined by the annular flange, thereby securing each outer rotor blade of the corresponding row to the flange (e.g., in a dovetail connection).

Using an annular flange coupled between the first and second drum segments to secure the outer rotor blades to the drum eliminates the need to form mounting features on or within the drum. Specifically, as described above, conventional methods for coupling the outer rotor blades to the drum require the formation of various mounting features, such holes and/or slots, to permit connection of the blades to the drum. However, securing the outer rotor blades to the annular flange coupled between the first and second annular drum segments eliminates the need for the mounting holes in drum. Moreover, the use of the annular flange simplifies the drum, thereby providing an increased service life.

Figure 1:
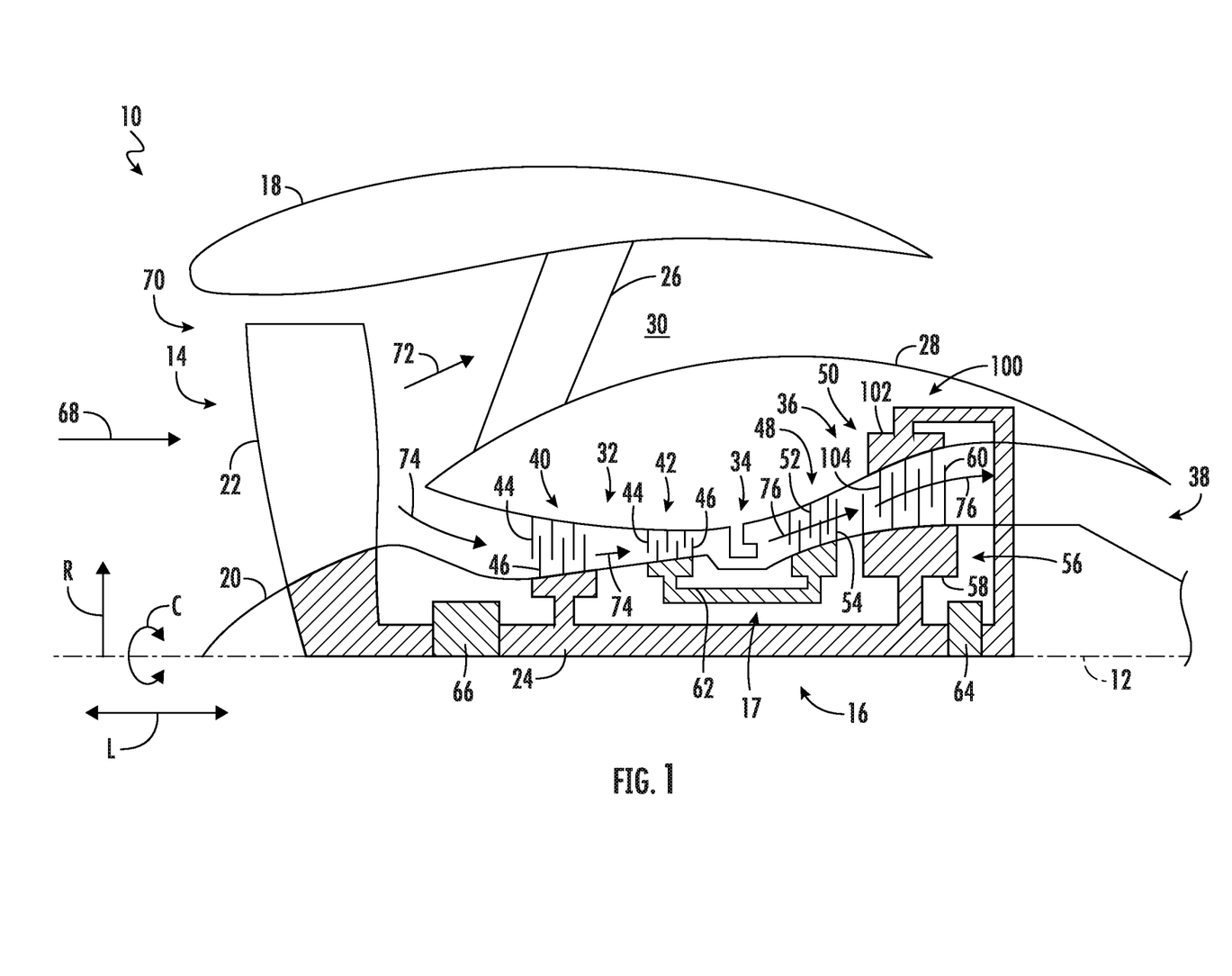
FIG. 1 is a schematic cross-sectional view of one embodiment of a gas turbine engine.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine. Furthermore, as shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 17 at least partially encased by an annular nacelle 18. More specifically, the fan 14 may include a fan rotor 20 and a plurality of fan blades 22 (one is shown) coupled to the fan rotor 20. In this respect, the fan blades 22 are spaced apart from each along the circumferential direction C and extend outward from the fan rotor 20 along the radial direction R. Moreover, the LP and HP spools 16, 17 are positioned downstream from the fan 14 along the axial centerline 12 (i.e., in the longitudinal direction L). As shown, the LP spool 16 is rotatably coupled to the fan rotor 20 via a low-pressure (LP) shaft 24, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 17 and the nacelle 18 along the radial direction R. As such, the struts 26 support the nacelle 18 relative to the outer casing 28 such that the outer casing 28 and the nacelle 18 define a bypass airflow passage 20 positioned therebetween.

The outer casing 28 generally surrounds, in serial flow order, a compressor section 32, a combustion section 34, a turbine section 36, and an exhaust section 38. Specifically, in several embodiments, the compressor section 32 may include a low-pressure (LP) compressor 40 of the LP spool 16 and a high-pressure (HP) compressor 42 of the HP spool 17 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 17 and a low-pressure (LP) turbine 50 of the LP spool 16 positioned downstream from the HP turbine 48 along the axial centerline 12. In one embodiment, the HP turbine 48 may include one or more rows of stator vanes 52 interdigitated with one or more rows of turbine rotor blades 54. As will be described below, the LP turbine 50 may include an inner rotor 56 and an outer rotor 100. In several embodiments, the inner rotor 56 includes an inner rotor hub 58 and one or more rows of inner rotor blades 60 extending outward from the hub 58 in the radial direction R. Moreover, the outer rotor 100 includes a drum 102 and one or more rows of outer rotor blades 104 extending inward from the drum 102 toward the axial centerline 12 in the radial direction R. As shown, the rows of outer rotor blades 104 are interdigitated with the rows of inner rotor blades 60. Additionally, the inner and outer rotors 56, 100 rotate in opposite directions.

Additionally, the engine 10 includes the low-pressure (LP) shaft 24 of the LP spool 16 and a high pressure (HP) shaft 62 of the HP spool 17 positioned concentrically around the LP shaft 24. In such embodiments, the HP shaft 62 rotatably coupled the HP turbine rotor blades 54 and the HP compressor rotor blades 46 such that rotation of the HP turbine rotor blades 54 rotatably drives HP compressor rotor blades 46. As shown, the LP shaft 24 is directly coupled to the inner rotor 56 of the LP turbine 50 and the LP compressor rotor blades 46. Furthermore, the LP shaft 24 is coupled to the outer rotor 100 of the LP turbine 50 via a gearbox 64 and the fan 14 via a gearbox 66. In this respect, the rotation of the inner and outer rotors 56, 100 rotatably drives the LP compressor rotor blades 46 and the fan blades 22.

In several embodiments, the engine 10 may generate thrust to propel an aircraft. More specifically, during operation, air (indicated by arrow 68) enters an inlet portion 70 of the engine 10. The fan 14 supplies a first portion (indicated by arrow 72) of the air 68 to the bypass airflow passage 20 and a second portion (indicated by arrow 74) of the air 68 to the compressor section 32. The second portion 72 of the air 68 first flows through the LP compressor 40 in which the rotor blades 46 therein progressively compress the second portion 72 of the air 68. Next, the second portion 72 of the air 68 flows through the HP compressor 42 in which the rotor blades 46 therein continue progressively compressing the second portion 72 of the air 68. Thereafter, the second portion 72 of the air 68 is delivered to the combustion section 34. In the combustion section 34, the compressed second portion 72 of the air 68 mixes with fuel and burns to generate high-temperature and high-pressure combustion gases 76. Thereafter, the combustion gases 76 flow through the HP turbine 48 in which the HP turbine rotor blades 54 extract a first portion of kinetic and/or thermal energy therefrom. This energy extraction rotates the HP shaft 62, thereby driving the HP compressor 42. The combustion gases 76 then flow through the LP turbine 50 in which the inner and outer rotor blades 60, 104 extract a second portion of kinetic and/or thermal energy therefrom. This energy extraction causes inner and outer rotors 56, 100 to rotate in opposite directions. The rotation of the inner rotor 56 and the outer rotor 100 (via the gearbox 64) subsequently rotate the LP shaft 24, thereby driving the LP compressor 40 and the fan 14 (via the gearbox 66). The combustion gases 76 then exit the core engine 16 through the exhaust section 38.

Figure 2:
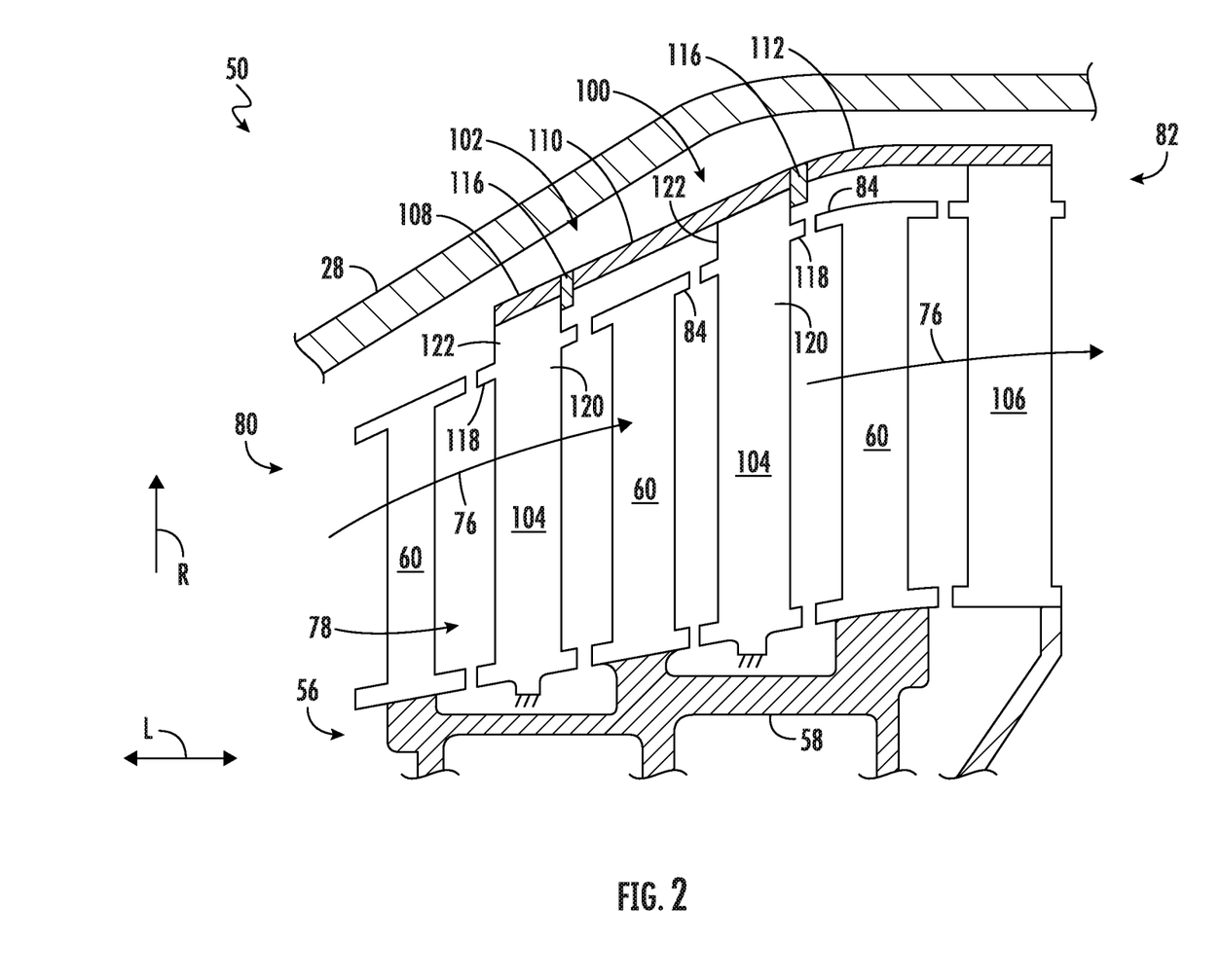
FIG. 2 is a cross-sectional view of one embodiment of a turbine of a gas turbine engine.

FIG. 2 is a cross-sectional view of one embodiment of the LP turbine 50 of the gas turbine engine 10. As shown, the LP turbine 50 defines a hot gas path 78 through which the combustion gases 76 flow during operation of the engine 10. More specifically, the hot gas path 78 generally extends along the axial centerline 12 (i.e., in the longitudinal direction L) from an upstream end 80 of the LP turbine 50 to a downstream end 82 of the LP turbine 50. Furthermore, the hot gas path 76 extends in the radial direction R along the length of the inner and outer rotor blades 60, 104. In this respect, as the combustion gases 76 flow along the hot gas path 78, the combustion gases 76 rotate the inner rotor blades 60 in a first direction. The rotation of the inner rotor blades 60 in the first direction, in turn, rotates the inner rotor hub 58 and, consequently, the LP shaft 24 (FIG. 1) in the first direction for driving the LP compressor 40 (FIG. 1) and the fan 14 (FIG. 1). In addition, the combustion gases 76 rotate the outer rotor blades 104 in an opposite, second direction while flowing along the hot gas path 78. The rotation of the outer rotor blades 104 in the second direction, in turn, rotates the drum 102 in the second direction. In some embodiments, the drum 102 rotatably coupled to the gearbox 64 (FIG. 1) via an outlet blade 106 positioned at the downstream end 82 of the LP turbine 50. Thus, the gearbox 64 permits the rotation of the outlet blade 106 in the second direction to drive the LP shaft 24 in the first direction.

Figure 3:
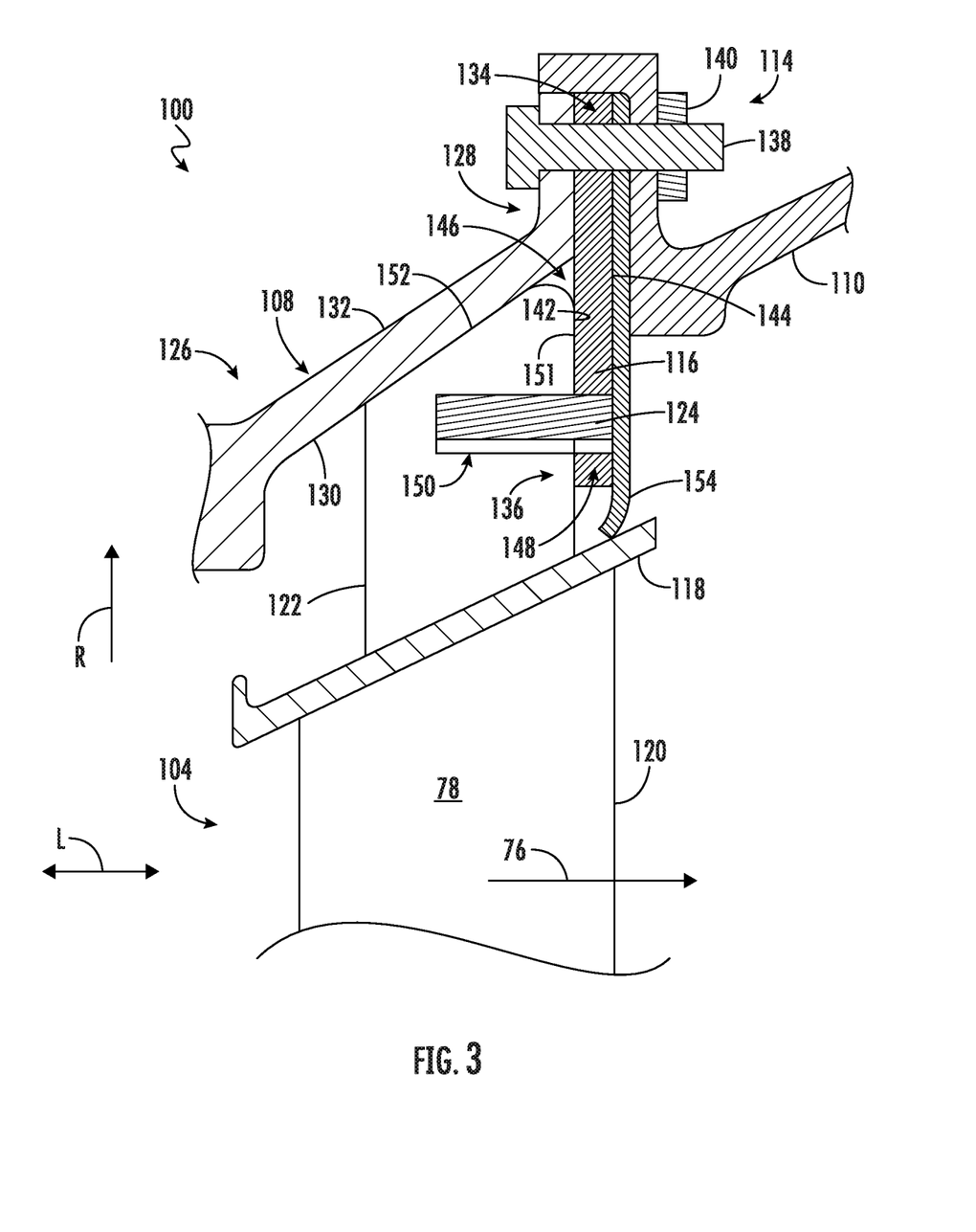
FIG. 3 is a partial cross-sectional view of one embodiment of an outer rotor of a turbine of a gas turbine engine, particularly illustrating a blade of the outer rotor coupled to a drum of the outer rotor via a pin.

As mentioned above, the outer rotor 100 includes an annular drum 102. As shown, the drum 102 is positioned outward from the inner and outer rotor blades 60, 104 along the radial direction R and at least partially encloses the rotor blades 60, 104 along the circumferential direction C. In several embodiments, the drum 102 is formed from a plurality of annular drum segments 108, 110, 112. As shown, the drum segments 108, 110, 112 are spaced apart from each other along the axial centerline 12 (i.e., in the longitudinal direction L) and removably coupled together via suitable fasteners 114 (FIG. 3). Moreover, an annular flange 116 is positioned between each pair of adjacent drum segments 108, 110, 112 along the axial centerline 12. As will be described below, the flanges 116 are used to couple the outer rotor blades 104 to the drum 102. In the illustrated embodiment, the drum 102 is formed from three drum segments 108, 110, 112. Specifically, as shown, the drum 102 includes a first annular drum segment 108, a second annular drum segment 110 positioned adjacent to and downstream of the first drum segment 108 along the axial centerline 12, and a third annular drum segment 112 positioned adjacent to and downstream of the second drum segment 110 along the axial centerline 12. However, in alternative embodiments, the drum 102 may be formed from any other suitable number of drum segments, such as two drum segments or four or more drum segments.

Additionally, each outer rotor blade 104 includes a platform 118, an airfoil section 120, and a shank section 122. More specifically, each airfoil section 120 extends inward from the corresponding platform 118 along the radial direction R, while each shank section 122 extends outward from the corresponding platform 118 along the radial direction R. As shown, the platform 118 of each outer rotor blade 104 and a tip shroud 84 of each inner rotor blade 60 collectively define the outer boundary of the hot gas path 78 in the radial direction R. In this respect, the airfoil sections 120 of the outer rotor blades 104 extend into the hot gas path 78 to extract energy from the combustion gases 76 flowing therethrough. Furthermore, as will be described below, the shank sections 122 of each outer rotor blade 104 are coupled to one of the annular flanges 116, thereby securing the rotor blades 104 to the drum 102.

In some embodiments, the rotor blades 104 and/or the drum segments 108, 110, 112 may be formed from a composite material. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC matrix is ceramic powder, including but not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a MMC matrix material include, but are not limited to powder metals such as, but not limited to, aluminum or titanium capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load caring element. However, in alternative embodiments, the rotor blades 104 and/or the drum segments 108, 110, 112 may be formed from a non-composite material, such a nickel-based and/or cobalt-based alloys.

The configuration of the gas turbine engine 10 described above and shown in FIGS. 1 and 2 are provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 4:
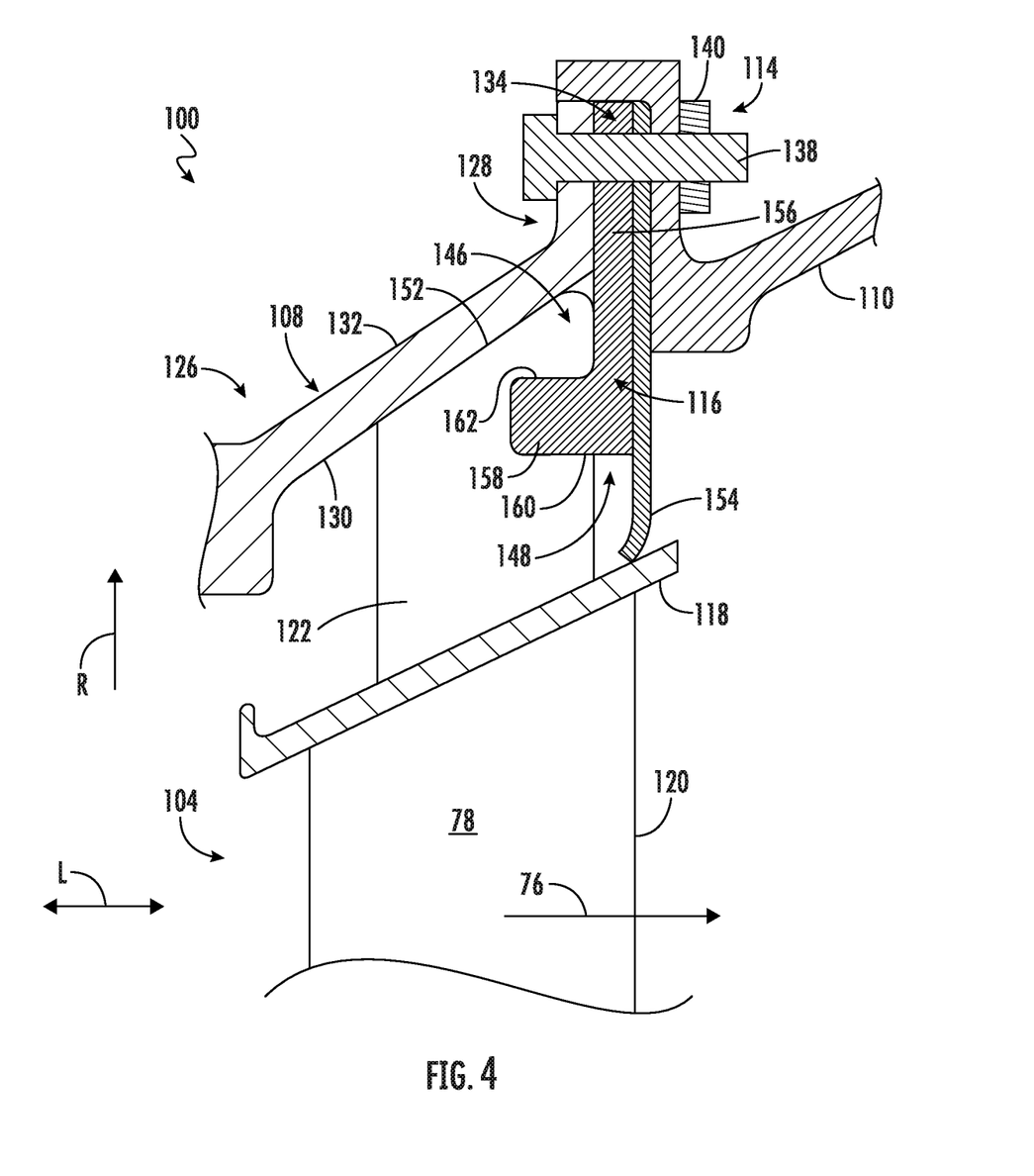
FIG. 4 is a partial cross-sectional view of another embodiment of an outer rotor of a turbine of a gas turbine engine, particularly illustrating a blade of the outer rotor coupled to a drum of the outer rotor via a dovetail connection.
Figure 5:
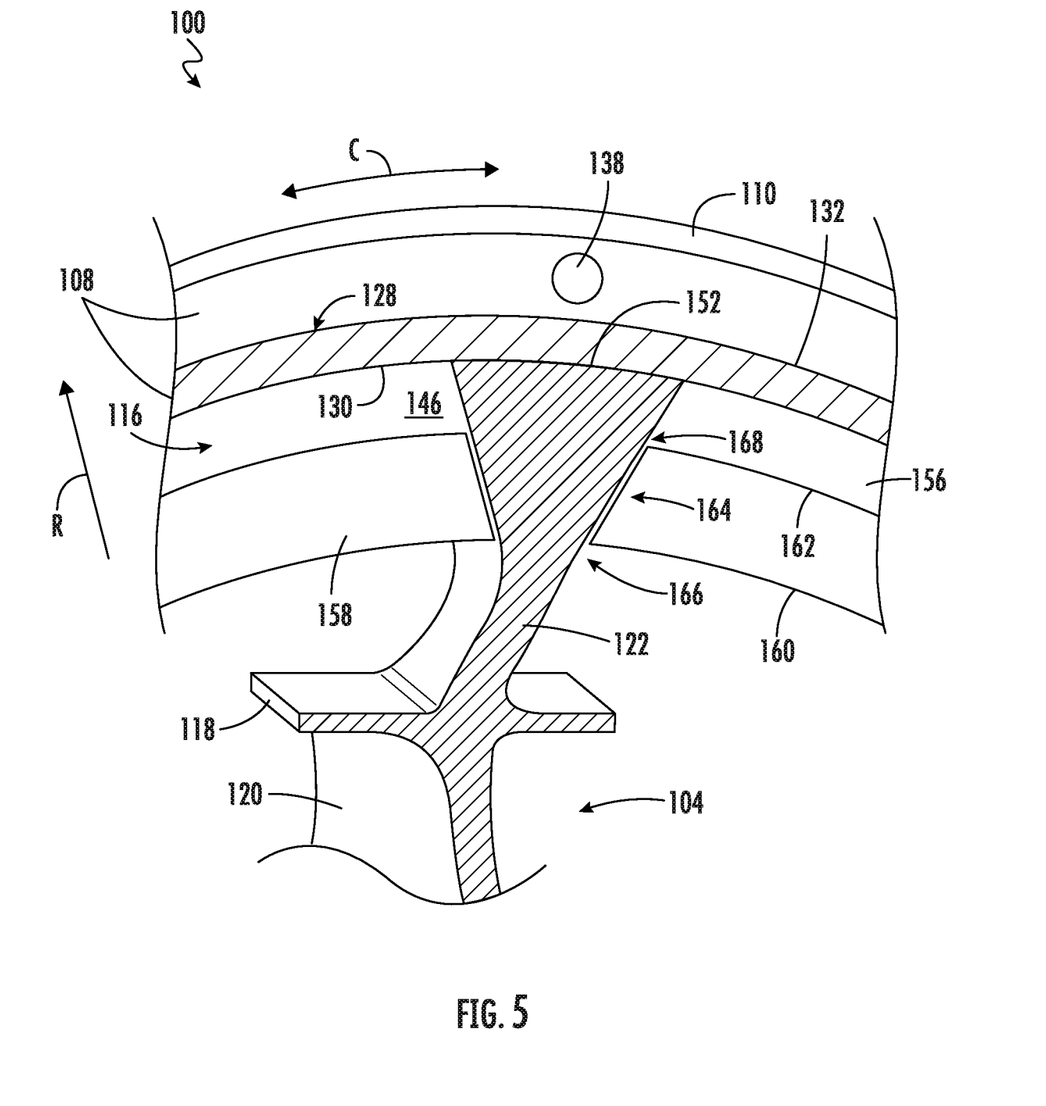
FIG. 5 is another partial cross-section of the embodiment of the outer rotor shown in FIG. 4, further illustrating the blade of the outer rotor coupled to the drum of the outer rotor via a dovetail connection.

FIGS. 3-5 are various views of embodiments of an outer rotor 100 of a turbine of a gas turbine engine. Specifically, FIG. 3 is a partial cross-sectional view of one embodiment of the outer rotor 100, particularly illustrating an outer rotor blade 104 of the outer rotor 100 coupled to a drum 102 of the outer rotor 100 via a pin 124. In addition, FIGS. 4 and 5 are differing partial cross-sectional views of another embodiment of the outer rotor 100, particularly illustrating an outer rotor blade 104 of the outer rotor 100 coupled to a drum 102 of the outer rotor 100 via a dovetail connection. In general, the outer rotor 100 will be described herein with reference to the gas turbine 10 described above with reference to FIGS. 1 and 2. However, the disclosed outer rotor 100 may generally be used with gas turbine engines having any other suitable engine configuration. For example, in other embodiments, the outer rotor 100 may be incorporated into any other turbine of the turbine section 36, such as the HP turbine 48.

Referring particularly to FIG. 3, as mentioned above, the outer rotor 100 includes a first annular drum segment 108. More specifically, the first drum segment 108 extends along the axial centerline 12 (i.e., the longitudinal direction L) between an upstream end 126 and a downstream end 128. Furthermore, the first drum segment 108 extends along the radial direction R between an inner radial surface 130 and an outer radial surface 132. As shown, the downstream end 128 is in contact with the annular flange 116 and positioned outward from the upstream end 126 along the radial direction R. In this respect, the inner radial surface 130 may define an oblique angle within the axial centerline 12 as the inner radial surface 130 extends from the upstream end 126 to the downstream end 128. That is, the inner radial surface 130 extends outward in the radial direction R from the upstream end 126 to the downstream end 128. Although not shown in FIG. 3, the second and third annular drum segments 110, 112 (and any other drum segments) may have the same configuration.

Additionally, as mentioned above, the outer rotor 100 includes one or more annular flanges 116, with each flange 116 coupled between an adjacent pair of the drum segments along the axial centerline 12. As shown, a flange 116 is coupled between the first and second drum segments 108, 110. In this respect, the flange 116 extends inward along the radial direction R from an outer end 134 to an inner end 136. The outer end 134 is, in turn, coupled to the first and second drum segments 108, 110 via suitable fasteners 114, such as the illustrated bolts 138 (one is shown) and associated nuts 140 (one is shown). As will be described below, the inner end 136 of the flange 116 is coupled to the shank section 122 of the outer rotor blade 104. Moreover, the flange 116 extends along the axial centerline 12 (i.e., the longitudinal direction L) between an upstream surface 142 and a downstream surface 144. Any other flanges 116 of the outer rotor 100 may be configured in the same manner.

In several embodiments, the first drum segment 108 and the annular flange 116 defines a cavity 146 in which the shank section 122 of the outer rotor blade 104 is received. More specifically, the cavity 146 is defined by the inner radial surface 130 of the first drum segment 108 and the upstream surface 142 of the annular flange 116. As mentioned above, the inner radial surface 130 of the first drum segment 108 extends outward in the radial direction R from its upstream end 126 to its downstream end 128. Moreover, the upstream surface 142 of the annular flange 116 generally extends perpendicular to the axial centerline 12. Thus, as shown, the cavity 146 has a conical shape. This conical shape, in turn, prevents movement of the corresponding outer rotor blade 104 relative to the drum 102 along the axial centerline 12 (i.e., in the longitudinal direction L). Specifically, the angle of the inner radial surface 130 of the first drum segment 108 prevents the shank section 122 from moving forward or upstream within the cavity 146 along the axial centerline 12 during operation. Furthermore, upstream surface 142 of the annular flange 116 prevents the shank section 122 from moving aft or downstream along the axial centerline 12 during operation.

Moreover, the outer rotor 100 may include one or more pins 124, with each pin 124 securing one of the outer rotor blades 104 to a corresponding annular flange 116. As shown, the annular flange 116 defines an annular flange aperture 148 extending through the flange 116 along the longitudinal direction L. Furthermore, the shank section 122 of the outer rotor blade 104 defines a shank section cavity 150 extending upstream along the longitudinal direction L from a downstream or aft surface 151 of the shank section 122. In addition, the annular flange aperture 148 and the shank section cavity 150 are aligned with each other in the radial and circumferential directions R, C. In this respect, the pin 124 is installed or otherwise received within the annular flange aperture 148 and the shank section cavity 150. Specifically, in several embodiments, the pin 124 is installed within the annular flange aperture 148 in a press-fit relationship. Furthermore, the pin 124 is installed within the shank section cavity 150 such that pin is unable to move relative to the shank section 122 along the circumferential direction C, thereby preventing movement of the shank section 122 within the cavity 146 in the circumferential direction C. However, the shank section cavity 150 is sized such that the pin 124 is able to move within the cavity 146 along the radial direction R. Thus, the pin 124 and the inner radial surface 130 of the first drum segment 108 retain the shank section 122 within the cavity 146 in the radial direction R. For example, the pin 124 retains the shank section 122 within the cavity 146 when the engine 10 is not operating and the corresponding outer rotor blade 104 is positioned above the axial centerline 12 relative to the direction of gravity. The enlarged radial dimension of the shank section cavity 150 permits the shank portion 122 to move outward along the radial direction R during operation of the engine 10 such that an outer radial surface 152 of the shank portion 122 contacts the inner radial surface 130 of the first drum segment 108. This prevents the pin 124 supporting the load of the outer rotor blade 104 during operation of the engine 10.

Additionally, in some embodiments, the outer rotor 100 may include one or more seals 154. For example, as shown, a seal 154 may be positioned between the downstream surface 144 of the annular flange 116 and the second drum segment 110 along the axial centerline 12. Moreover, the seal 154 may extend along the downstream surface 144 of the annular flange 116 and inward along the radial direction R past the inner end 148 of the flange 116. As such, the seal 154 prevents the combustion gases 76 from bypassing the airfoil 120 by flowing across the shank 122. However, some embodiments of the outer rotor 100 may be devoid of the seals 154.

Although FIG. 3 illustrates a single outer rotor blade 104 coupled to an annular flange 116 positioned between the first and second drum segments 108, 110 via a pin 124, the other outer rotor blades 104 of the outer rotor 100 may be coupled to the flanges 116 of the outer rotor 100 (e.g., the flange 116 shown in FIG. 3 or the flange 116 positioned between the second and third drum segments 110, 112) in the same manner.

Referring now to FIGS. 4 and 5, the outer rotor 100 is configured the same as or substantially the same as the outer rotor 100 shown in FIG. 3. For example, the outer rotor 100 shown in FIGS. 4 and 5 includes an annular flange 116 coupled between first and second annular drum segments 108, 110 along the axial centerline 12. Moreover, the annular flange 116 extends inward along the radial direction R from an outer end 134 to an inner end 136, with the outer end 134 coupled to the first and second annular drum segments 108, 110 and the inner end 136 coupled to the shank section 122 of the outer rotor blade 104. Additionally, the first drum segment 108 and the annular flange 116 defines a cavity 146 in which the shank section 122 is received. However, unlike the embodiment illustrated in FIG. 3, the annular flange 116 of the outer rotor 100 shown in FIGS. 4 and 5 includes a radial wall 156 extending inward along the radial direction R from the outer end 134 of the flange 116 to the inner end 136 of the flange 116. Furthermore, the flange 116 includes an axial wall 158 extending forward or upstream from the inner end 136 of the radial wall 156 along the axial centerline 12 (i.e., in the longitudinal direction L). The axial wall 158, in turn, extends along the radial direction R between an inner radial surface 160 to an outer radial surface 162. Thus, in such embodiments, the annular flange 116 may define a L-shaped.

Referring particularly to FIG. 5, the annular flange 116 may define one or more slots 164. In general, each slot 164 may receive a portion of the shank section 122 of one of the outer rotor blades 104. As shown, the flange 116 defines a slot 164 extending through its axial wall 158 in the radial direction R. In this respect, the inner radial surface 160 of the axial wall 158 defines an inner opening 166 of the slot 164 and the outer radial surface 162 of the axial wall 158 defines an outer opening 168 of the slot 164. In several embodiments, the slot 164 has a dovetail configuration. In such embodiments, the cross-sectional area of the outer opening 168 has a larger cross-sectional area than the inner opening 166 such that a dovetail connection is formed when the portion of the shank section 122 is received within the slot 164. Thus, the slot 164 narrows as it extends inward along the radial direction R. Moreover, the dovetail connection retains the shank section 122 of the outer rotor blade 104 within the slot 164, thereby preventing the outer rotor blade 104 from moving relative to the drum 102 in the circumferential direction C.

However, the dovetail connection permits the outer rotor blade 104 to move relative to the drum 102 in the along the radial direction R. More specifically, the dovetail shape of the slot 164 prevents movement of the outer rotor blade 104 inward along the radial direction R when the engine 10 is not operating and the outer rotor blade 104 is positioned above the axial centerline 12 relative to the direction of gravity. The dovetail connection also permits the shank portion 122 to move outward along the radial direction R during operation of the engine 10 such that the outer radial surface 152 of the shank portion 122 contacts the inner radial surface 130 of the first drum segment 108. This prevents the flange 116 from supporting the load of the outer rotor blade 104 during operation of the engine 10.

Although FIGS. 4 and 5 illustrates a single outer rotor blade 104 coupled to an annular flange 116 positioned between the first and second drum segments 108, 110 via a dovetail connection, the other outer rotor blades 104 of the outer rotor 100 may be coupled to the flanges 116 of the outer rotor 100 (e.g., the flange 116 shown in FIG. 3 or the flange 116 positioned between the second and third drum segments 110, 112) in the same manner.

As described above, each outer rotor blade 104 of the outer rotor 100 is coupled to one or more flanges 116 (e.g., via a corresponding pin 124 or slot 164). Each flange 116 is, in turn, coupled between an adjacent pair drum segment 108, 110, 112 forming the drum 102 of the outer rotor 100. In this respect, the flanges 116 permit coupling of the outer rotor blades 104 to the drum 102 without requiring retention features on or within the drum 102 itself. Thus, the drum segments 108, 110, 112 may be axisymmetric (i.e., simplified), which allows for a decreased drum thickness and weight and a longer service life.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A rotor assembly for a gas turbine engine, the gas turbine engine defining an axial centerline and a radial direction extending outward from the axial centerline, the rotor assembly comprising: a shaft; first and second annular drum segments coupled to the shaft; an annular flange positioned between the first and second annular drum segments along the axial centerline, the annular flange coupled to the first and second annular outer drum segments; and a blade including a shank section and an airfoil section, the shank section coupled to the annular flange such the airfoil section extends inward along the radial direction toward the axial centerline and into a hot gas path of the gas turbine engine.

The rotor assembly of one or more of these clauses, wherein the annular flange extends in the radial direction between an outer end of the annular flange and an inner end of the annular flange, the outer end coupled to the first and second annular drum segments, the inner end coupled to the shank section of the blade such that the blade is positioned inward of the first and second annular drum segments along the radial direction.

The rotor assembly of one or more of these clauses, wherein the first annular drum segment extends along the axial centerline from an upstream end of the first annular drum segment to a downstream end of the first annular drum segment, the downstream end in contact with the annular flange and positioned outward from the upstream end along the radial direction from the upstream end.

The rotor assembly of one or more of these clauses, wherein the first annular drum segment comprises an inner surface defining an oblique angle relative to the axial centerline of the gas turbine engine.

The rotor assembly of one or more of these clauses, wherein the inner surface of the first annular drum segment and a forward surface of the annular flange define a cavity in which a portion of the shank section of the blade is received.

The rotor assembly of one or more of these clauses, wherein the annular flange defines a slot extending through the annular flange in the radial direction in which a portion of the shank section is positioned.

The rotor assembly of one or more of these clauses, wherein the annular flange comprises a radial wall coupled to the first and second annular drum segments and an axial wall extending upstream along the axial centerline from the radial wall, the axial wall defining the slot.

The rotor assembly of one or more of these clauses, wherein the axial wall of the annular flange includes an outer surface defining an outer opening of the slot and an inner surface defining an inner opening of the slot, the outer opening having a larger cross-sectional area than the inner opening such that the portion of the shank section is received within the slot to form a dovetail connection.

The rotor assembly of one or more of these clauses, wherein the annular flange defines an annular flange aperture and the shank section defines a shank aperture, the rotor assembly further comprising: a pin positioned within the annular flange aperture and the shank aperture to couple the blade to the annular flange.

The rotor assembly of one or more of these clauses, wherein the pin is received within the annular flange aperture in a press-fit relationship.

The rotor assembly of one or more of these clauses, wherein the pin is moveable within the shank aperture in the radial direction to permit the shank section to move relative to the first annular drum segment along the radial direction.

The rotor assembly of one or more of these clauses, wherein the first annular drum segment is axisymmetric.

The rotor assembly of one or more of these clauses, further comprising: a seal coupled between the annular flange and the second annular drum segment along the axial centerline.

A gas turbine engine defining an axial centerline and a radial direction extending outward from the axial centerline, the gas turbine engine comprising: a turbine section; and a shaft coupling the turbine section to at least one of a compressor section of the gas turbine engine or a fan section of the gas turbine engine, wherein the turbine section comprises: first and second annular drum segments coupled to the shaft; an annular flange positioned between the first and second annular drum segments along the axial centerline, the annular flange coupled to the first and second annular outer drum segments; and a blade including a shank section and an airfoil section, the shank section coupled to the annular flange such the airfoil section extends inward along the radial direction toward the axial centerline and into a hot gas path of the gas turbine engine.

The gas turbine engine of one or more of these clauses, wherein the annular flange extends in the radial direction between an outer end of the annular flange and an inner end of the annular flange, the outer end coupled to the first and second annular drum segments, the inner end coupled to the shank section of the blade.

The gas turbine engine of one or more of these clauses, wherein the first annular drum segment extends along the axial centerline from an upstream end of the annular drum segment to a downstream end of the annular drum segment, the downstream end in contact with the annular flange and positioned outward along the radial direction from the upstream end.

The gas turbine engine of one or more of these clauses, wherein the first annular drum segment comprises an inner surface defining an oblique angle relative to the axial centerline of the gas turbine engine.

The gas turbine engine of one or more of these clauses, wherein the inner surface of the first annular drum segment and a forward surface of the annular flange define a cavity in which a portion of the shank section of the blade is received.

The gas turbine engine of one or more of these clauses, wherein the annular flange defines a slot extending through the annular flange in the radial direction in which a portion of the shank is positioned.

The gas turbine engine of one or more of these clauses, wherein the annular flange defines an annular flange aperture and the shank section defines a shank aperture, the gas turbine engine further comprising: a pin positioned within the annular flange aperture and the shank aperture to couple the blade to the annular flange

What is claimed is:

1. A rotor assembly for a gas turbine engine, the gas turbine engine defining an axial centerline and a radial direction extending outward from the axial centerline, the rotor assembly comprising:
   a shaft;
   first and second annular drum segments coupled to the shaft;
   an annular flange positioned between the first and second annular drum segments along the axial centerline, the annular flange coupled to the first and second annular outer drum segments; and
   a blade including a shank section and an airfoil section, the shank section coupled to the annular flange such the airfoil section extends inward along the radial direction toward the axial centerline and into a hot gas path of the gas turbine engine.

2. The rotor assembly of claim 1, wherein the annular flange extends in the radial direction between an outer end of the annular flange and an inner end of the annular flange, the outer end coupled to the first and second annular drum segments, the inner end coupled to the shank section of the blade such that the blade is positioned inward of the first and second annular drum segments along the radial direction.

3. The rotor assembly of claim 1, wherein the first annular drum segment extends along the axial centerline from an upstream end of the first annular drum segment to a downstream end of the first annular drum segment, the downstream end in contact with the annular flange and positioned outward from the upstream end along the radial direction from the upstream end.

4. The rotor assembly of claim 3, wherein the first annular drum segment comprises an inner surface defining an oblique angle relative to the axial centerline of the gas turbine engine.

5. The rotor assembly of claim 4, wherein the inner surface of the first annular drum segment and a forward surface of the annular flange define a cavity in which a portion of the shank section of the blade is received.

6. The rotor assembly of claim 1, wherein the annular flange defines a slot extending through the annular flange in the radial direction in which a portion of the shank section is positioned.

7. The rotor assembly of claim 6, wherein the annular flange comprises a radial wall coupled to the first and second annular drum segments and an axial wall extending upstream along the axial centerline from the radial wall, the axial wall defining the slot.

8. The rotor assembly of claim 7, wherein the axial wall of the annular flange includes an outer surface defining an outer opening of the slot and an inner surface defining an inner opening of the slot, the outer opening having a larger cross-sectional area than the inner opening such that the portion of the shank section is received within the slot to form a dovetail connection.

9. The rotor assembly of claim 1, wherein the annular flange defines an annular flange aperture and the shank section defines a shank aperture, the rotor assembly further comprising:
   a pin positioned within the annular flange aperture and the shank aperture to couple the blade to the annular flange.

10. The rotor assembly of claim 9, wherein the pin is received within the annular flange aperture in a press-fit relationship.

11. The rotor assembly of claim 9, wherein the pin is moveable within the shank aperture in the radial direction to permit the shank section to move relative to the first annular drum segment along the radial direction.

12. The rotor assembly of claim 1, wherein the first annular drum segment is axisymmetric.

13. The rotor assembly of claim 1, further comprising:
   a seal coupled between the annular flange and the second annular drum segment along the axial centerline.

14. A gas turbine engine defining an axial centerline and a radial direction extending outward from the axial centerline, the gas turbine engine comprising:
   a turbine section; and
   a shaft coupling the turbine section to at least one of a compressor section of the gas turbine engine or a fan section of the gas turbine engine, wherein the turbine section comprises:
      first and second annular drum segments coupled to the shaft;
      an annular flange positioned between the first and second annular drum segments along the axial centerline, the annular flange coupled to the first and second annular outer drum segments; and
      a blade including a shank section and an airfoil section, the shank section coupled to the annular flange such the airfoil section extends inward along the radial direction toward the axial centerline and into a hot gas path of the gas turbine engine.

15. The gas turbine engine of claim 14, wherein the annular flange extends in the radial direction between an outer end of the annular flange and an inner end of the annular flange, the outer end coupled to the first and second annular drum segments, the inner end coupled to the shank section of the blade.

16. The gas turbine engine of claim 14, wherein the first annular drum segment extends along the axial centerline from an upstream end of the annular drum segment to a downstream end of the annular drum segment, the downstream end in contact with the annular flange and positioned outward along the radial direction from the upstream end.

17. The gas turbine engine of claim 16, wherein the first annular drum segment comprises an inner surface defining an oblique angle relative to the axial centerline of the gas turbine engine.

18. The gas turbine engine of claim 17, wherein the inner surface of the first annular drum segment and a forward surface of the annular flange define a cavity in which a portion of the shank section of the blade is received.

19. The gas turbine engine of claim 14, wherein the annular flange defines a slot extending through the annular flange in the radial direction in which a portion of the shank is positioned.

20. The gas turbine engine of claim 14, wherein the annular flange defines an annular flange aperture and the shank section defines a shank aperture, the gas turbine engine further comprising:
   a pin positioned within the annular flange aperture and the shank aperture to couple the blade to the annular flange.

* * * * *